(12) United States Patent
Berman et al.

(10) Patent No.: US 7,184,218 B1
(45) Date of Patent: Feb. 27, 2007

(54) METHOD AND APPARATUS FOR INCREASING QUALITY AND RESOLUTION OF A PROJECTED IMAGE

(76) Inventors: Arthur Berman, 5635 Snowdon Pl., San Jose, CA (US) 95138; Michael Detro, 18644 Favore Ridge Rd., Los Gatos, CA (US) 95033

( * ) Notice: Subject to any disclaimer, the term of this patent is extended or adjusted under 35 U.S.C. 154(b) by 8 days.

(21) Appl. No.: 10/989,012

(22) Filed: Nov. 15, 2004

(51) Int. Cl.
G02B 3/00 (2006.01)
G02B 9/00 (2006.01)

(52) U.S. Cl. .................................. 359/649
(58) Field of Classification Search ............ 359/649, 359/625, 626
See application file for complete search history.

(56) References Cited

U.S. PATENT DOCUMENTS

| 3,811,770 | A | * | 5/1974 | Baus et al. | 355/67 |
| 4,988,188 | A | * | 1/1991 | Ohta | 359/619 |
| 5,626,411 | A | * | 5/1997 | Takahashi et al. | 353/94 |
| 6,987,621 | B2 | * | 1/2006 | Yoshihara | 359/649 |

* cited by examiner

*Primary Examiner*—Alicia M Harrington
(74) *Attorney, Agent, or Firm*—John Carpenter; Reed Smith, LLP

(57) ABSTRACT

A lens includes mechanical dithering that displaces pixels adjacent to undithered pixels. The dithering, for example, precisely places pixels above, below, and on both sides of the undithered pixel. Image data is supplemented with interpolation and/or new data in additional pixel locations. The image data may be projected by a dithered lens.

11 Claims, 8 Drawing Sheets

FIG 6
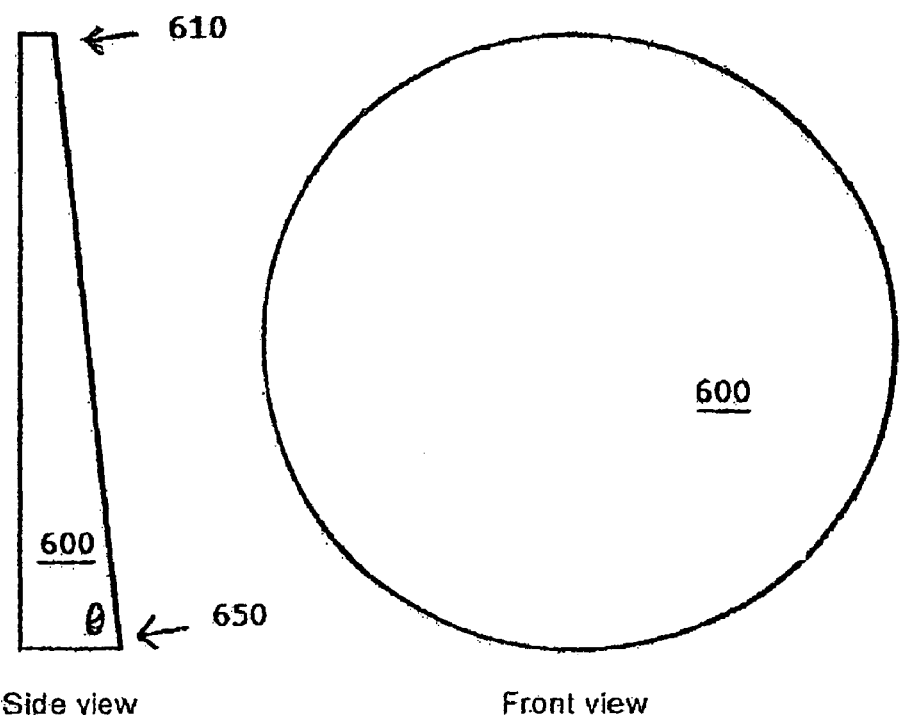
Side view · Front view
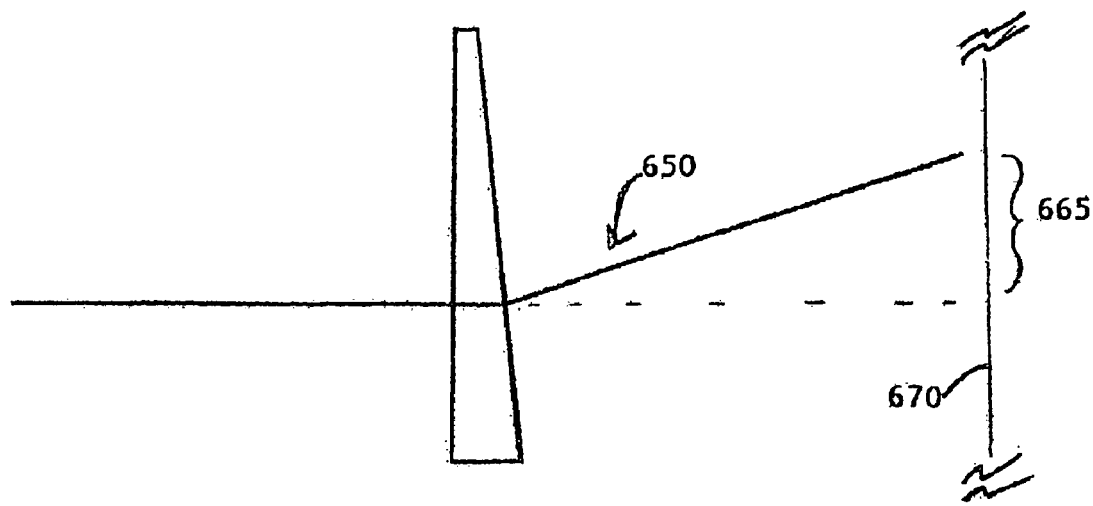

METHOD AND APPARATUS FOR INCREASING QUALITY AND RESOLUTION OF A PROJECTED IMAGE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to increasing quality of a projected image. In one embodiment, the invention is a method and device and/or apparatus to reduce the visibility of a "screen door" artifact present in the video image projected by various light engines based on pixilated displays. One way by which this is accomplished is through horizontal and vertical dithering of lens elements in the projection lens. Also disclosed is a method/device that increases the resolution of the projected image and may be used in combination with dithered lens elements.

2. Discussion of Background

The video image projected by a light engine based on a pixilated display contains an undesirable, visually observable artifact that is often called a "screen door". The appearance of the screen door is illustrated in FIG. 1. The name derives from the fact that the artifact consists of a grid of dark vertical and horizontal lines that outline every pixel. The visibility of the screen door is greatest in light engines based on High Temperature Poly Silicon microdisplays, is less visible in those based on Digital Light Processing microdisplays and is even less visible in those based on Liquid Crystal on Silicon (LCoS) microdisplays.

One of the quantities that define the quality of a projected video image is resolution. In pixilated displays this is determined, in part, by the number of pixels in the array. To project the highest quality image, it is desirable that the display resolution equal that of the resolving power of human vision (e.g. average resolving power, highest average resolving power, etc.). In the case of a display with a large screen diagonal (such as is commonly the case in HDTV), the pixel count of the display needs to be quite high. In practice, there are two approaches to adding pixels to the image:

(1) Additional same size pixels are added to the microdisplay. In this case, the physical size of the array and the microdisplay will grow. Unfortunately, the larger the microdisplay, the more expensive the microdisplay.

or (2) Additional smaller pixels are added to the microdisplay such that the array size is kept constant. This approach may not be technically possible. In any case, it is likely to make the microdisplay more difficult to manufacture and will almost certainly increase the visibility of the screen door artifact.

SUMMARY OF THE INVENTION

The present inventors have realized the need to reduce the screen door artifact present in projected images. The present invention provides a method to reduce the visibility of the screen door artifact that is applicable to light engines based on each of the technologies listed above and others.

In one embodiment, the present invention provides a projection lens, comprising a first lens dithered in a first direction and a second lens dithered in a second direction.

In another embodiment, the present invention provides a projection lens, comprising, a first vibrating element, and a first dithering lens coupled to the vibrating element.

In yet another embodiment, the present invention provides a projection television, comprising, a set of microdisplays, electronics for energizing the microdisplays with image content, a light engine comprising a light source and a set of optics configured to direct individual rays of light to each microdisplay and output a full color image modulated by the microdisplays, and a projection lens for projecting the output full color image to a display screen, wherein the projection lens comprises a set of lens elements including at least one dithered lens element.

The present invention also provides an apparatus/method to increase the resolution of the projected image. For example, utilizing a microdisplay of a given resolution, the present invention projects an image that may have 2 or 4 times the given resolution. In one embodiment, alone, or in combination with any of the above, the present invention provides new or interpolated video information that is displayed in each pixel position. In this way, the resolution of the projected image is increased by a factor equal to the number of pixel positions occupied by the new and/or interpolated video information.

Portions of both the device and method may be conveniently implemented in programming on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a drawing of a wedge shaped lens according to an embodiment of the present invention;

DESCRIPTION OF THE PREFERRED EMBODIMENTS

Figure 1:
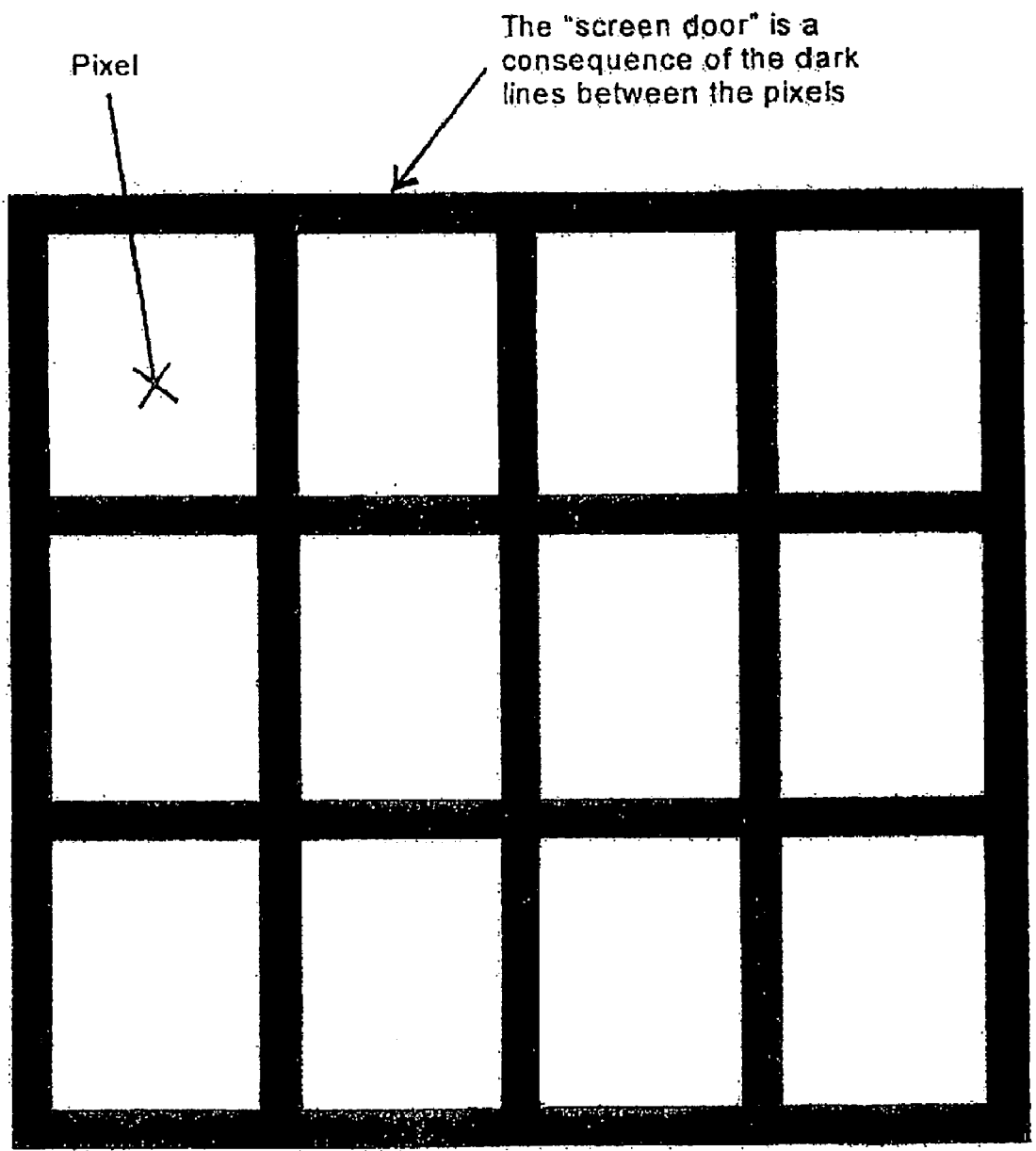
FIG. 1 is a representation of a screen door artifact.

In one embodiment, the present invention reduces visibility of the screen door artifact. Referring again to the drawings, wherein like reference numerals designate identical or corresponding parts, and more particularly to FIG. 2 thereof, there is illustrated an example set of lens elements in a projection lens including a dithered lens element and illustrating an example dithering motion (note that the illustration is conceptual rather than an accurate representation of any specific projection lens design).

Figure 2:
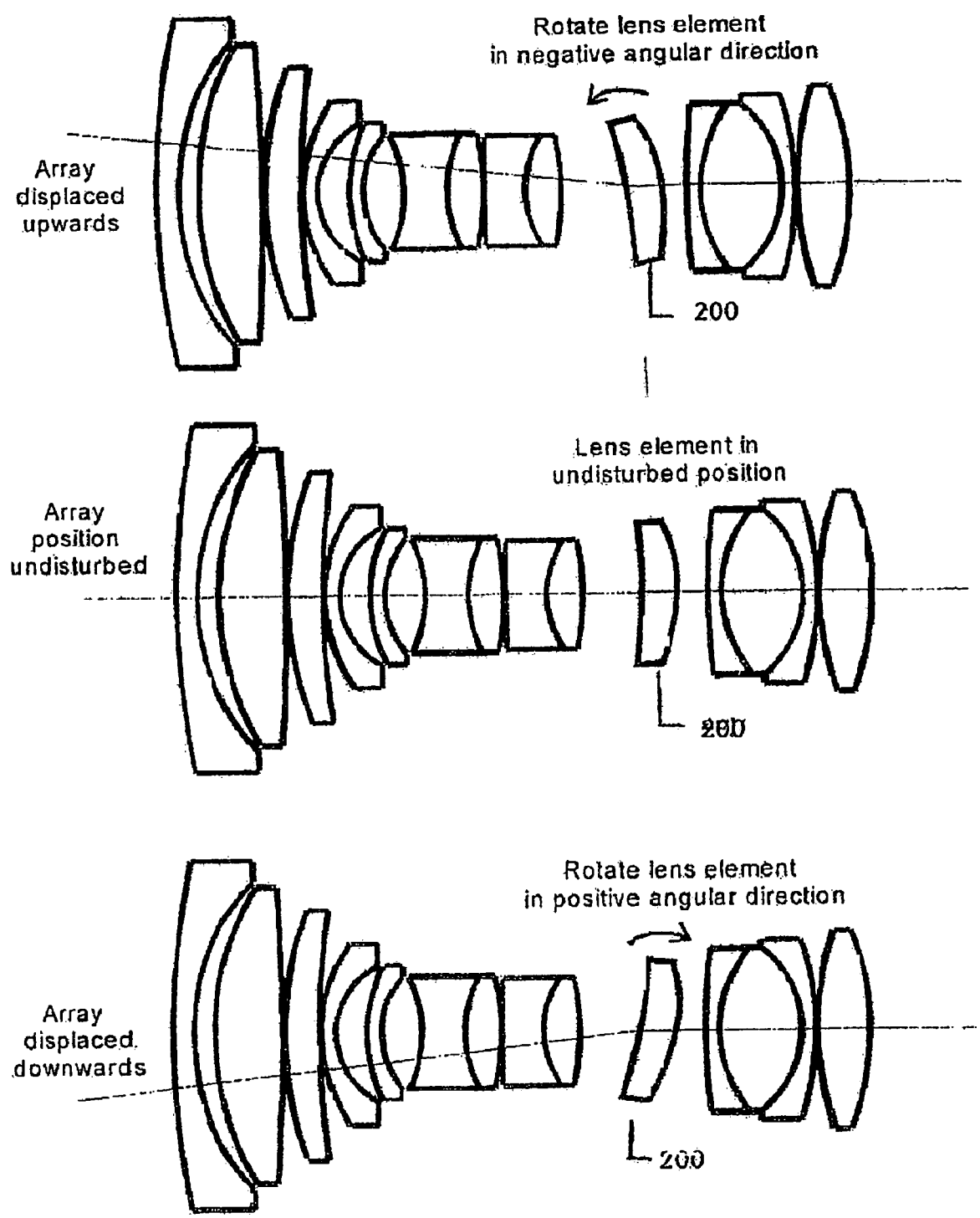
FIG. 2 is a example set of lenses in a projection lens including a dithered lens and illustrating an example dithering motion according to an embodiment of the present invention.

As shown in FIG. 2, one of the lens elements (200) is mechanically dithered along its horizontal axis. The motion illustrated in FIG. 2 is exagerated and the actual amount of movement is extremely small and chosen to produce an amount of displacement of a pixel on a display screen along the order of approximately one pixel. The effect of the dithering is such that, if the lens is tilted to a precise positive angle, the image is displaced vertically to a point just above the undisturbed pixel position.

If the lens is tilted to an equal negative angle the image is displaced vertically to a point just below the undisturbed pixel position. In a similar way, it is possible to dither the lens element about its' vertical axis such that the image is displaced to a point just to the left and then just to the right of the undisturbed pixel position. In one embodiment, the displacement places the dithered pixel in multiple positions directly adjacent to the undithered pixel, and/or some dithered pixels are both adjacent and over portions of the undithered pixel.

In one embodiment, the projection lens is designed such that one lens element is dithered vertically while another lens element is dithered horizontally. When the displacements of the lenses are of the proper magnitude and properly sequenced, the pixel moves to a position, for example, first to the left, then above, then to the right and then below the undisturbed pixel position. With this series of motions, the pixel array is sequentially positioned on top of the dark lines of the screen door artifact of the previous image. If the dithering is sufficiently rapid the viewer will not perceive the motions but will, rather, integrate the successive images such that the visibility of the screen door is greatly reduced. In one embodiment, a single lens is dithered along both its' horizontal and vertical axes.

Figure 3:
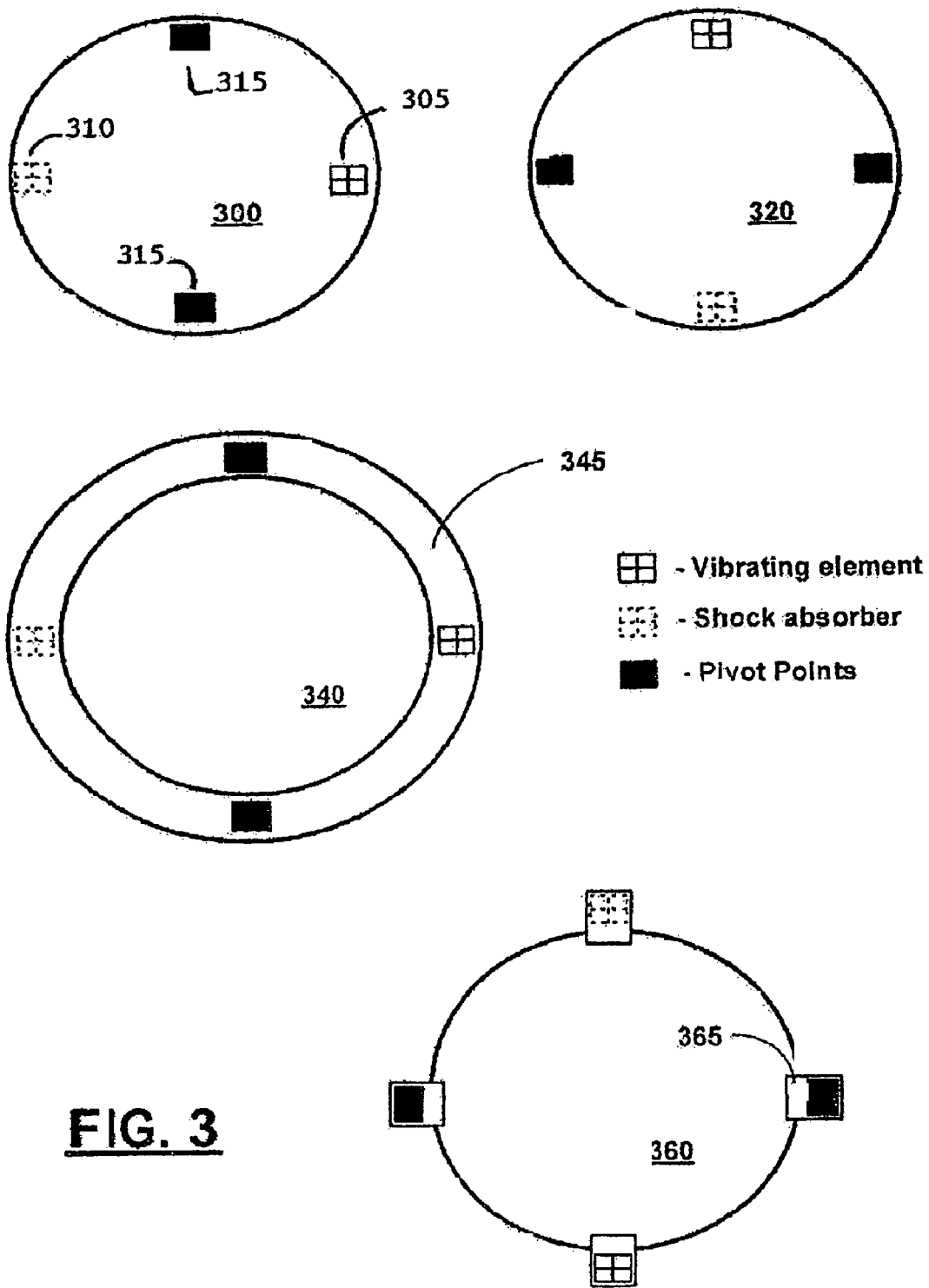
FIG. 3 is an illustration showing example placements of various elements and structures to implement a dithered lens according to various alternative embodiments of the present invention.

FIG. 3 is an illustration showing example placements of various elements and structures to implement a dithered lens. In FIG. 3, a first set of two lenses 300 and 320 are illustrated. Lens 300 includes a vibrating element 305, a shock absorbing element, and a pair of pivot points 315. Lens 300 is set up to be pivoted about its vertical axis (line between the pivot points) according to vibrations of the vibrating element. Lens 320 is similarly set up except that the shock absorber and vibrating elements swap places with the pivot points. Lens 320 is set up to be pivoted along its horizontal axis according to vibrations of its vibrating element. The vibrating elements are, for example, piezo electric materials. Thus both lenses combined result in dithering along two orthogonal axis (axes).

In one embodiment, the pivot points, vibrating element, and shock absorbers directly contact lenses 340 and 360. Lenses 340 and 360 illustrate alternative arrangements for coupling the pivot points, vibrating element, and shock absorber. Lens 340 has a ring coupler 345 (a couple surrounding the lens). The vibrating element, shock absorbers, and pivot point are attached to the ring coupler 345.

For lens 360, a set of extension paddles 365 are attached at strategic locations. The vibrating element, shock absorbers, and pivot points are then coupled to the extension paddles.

Figure 4:
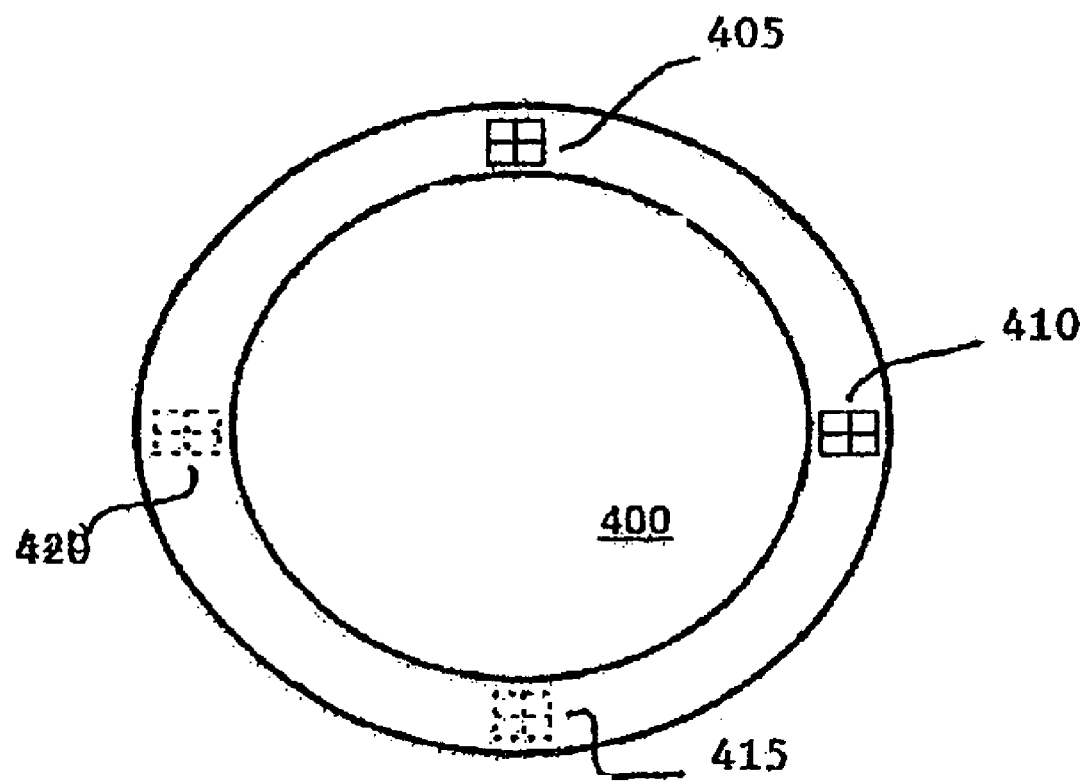
FIG. 4 is an illustration of a lens dithered on two orthogonal axis according to an embodiment of the present invention.

FIG. 4 is an illustration of a lens 400 dithered on two axis according to an embodiment of the present invention. Vibrating element 405 and 410 are respectively placed on a first and a second axis. The first and second axis are, for example, orthogonal. Shock absorbers 415 and 520 are also placed on each axis.

As noted above the vibrating elements may be piezo electric elements. The frequency may be adjusted so that the resultant dithered pixels at a rate to produce the desired integration.

Figure 5:
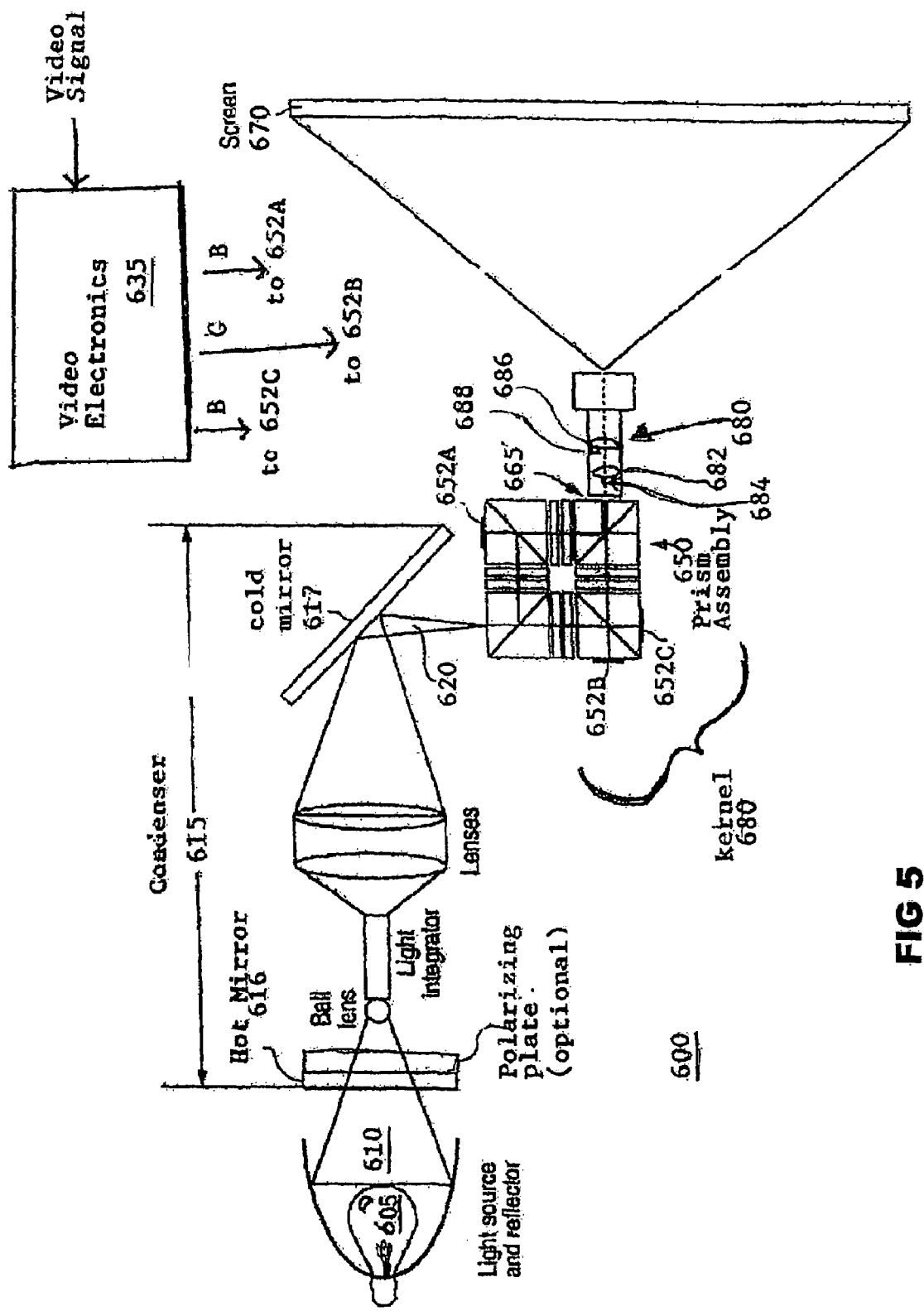
FIG. 5 is a drawing of a projection system incorporating one or more of the embodiments of the present invention.

FIG. 5 is a drawing of a projection system 600 incorporating one or more embodiments of the present invention. A light source 605 is configured to produce either polarized or unpolarized light and that is homogenized shaped, and otherwise processed by intermediate optics of condenser 615. The light is input to a prism assembly/kernel 680. The prism assembly has a set of processing faces each having an attached microdisplay device. The prism assembly/kernel 680 is configured to separate the input light into light channels, each light channel being directed to a corresponding individual one of the microdisplay devices 652 (in this example, microdisplay devices 652A, 652B, and 652C). The microdisplay devices 652 are, for example, LCoS microdisplays energized with image content for the corresponding light channel (electronics 635, for example, processes a standard video signal into image content of, for example, Red, Green, and Blue content for each microdisplay and corresponding to the color of each light channel). Image contents corresponding to each light channel are input to the microdisplay and used to modulate the corresponding light channel. Once reflected off the microdisplays, the modulated light channels are recombined and exit an output face 665 of the prism assembly/kernel 680.

In one embodiment, each of the respective image contents (e.g., video data for each light channel) include, for example, interpolated pixel data and/or new pixel data to increase the resolution of the projected image.

A projection lens 680 focuses the recombined light channels (e.g., now a full color video image) onto a display screen 670. In one embodiment, the projection lens includes a first dithered lens 682 that vibrates substantially about an x-axis direction and a second dithered lens 686 that vibrates substantially about an orthogonal y-axis direction. Piezo electric vibrators 684 and 688 are positioned to effect the x and y axis vibrations. In another embodiment, the vibrators vibrate at different rapidly changing frequencies.

In another embodiment, new or interpolated video information is displayed in a set of added pixel positions not provided by the microdisplay image arrays. In this way, the resolution of the projected image is increased by a factor equal to the number of added pixel positions. The interpolated dsdata is, for example, a combination of the color and brightness of nearby pixels.

Thus, in several embodiments, the present invention provides a dithered lens element in, for example, a projection lens. The dithered lens element is, for example, a lens element in a new projection lens design or a modification to lens element in an existing projection lens design.

In another embodiment of the invention, a lens having a wedge shape may be utilized to provide the a similar effect. FIG. 6 is a drawing of a wedge shaped lens 600. The wedge shaped lens 600 is a circular glass wedge having a thickness that linearly varies from a thick end 605 to a thin end 610

(note wedge angle θ). Included in the figure is a representation of the way in which the path of a light ray 650 is displaced after traveling through the wedge. The wedge angle determines the angular displacement of the light ray. In practice the wedge angle would be minimal and consistent with the displacement 655 of a projected image on a viewing screen 670 by, for example, an amount of less than one pixel (moving a pixel just enough to lessen the screen door effect).

Figure 7:
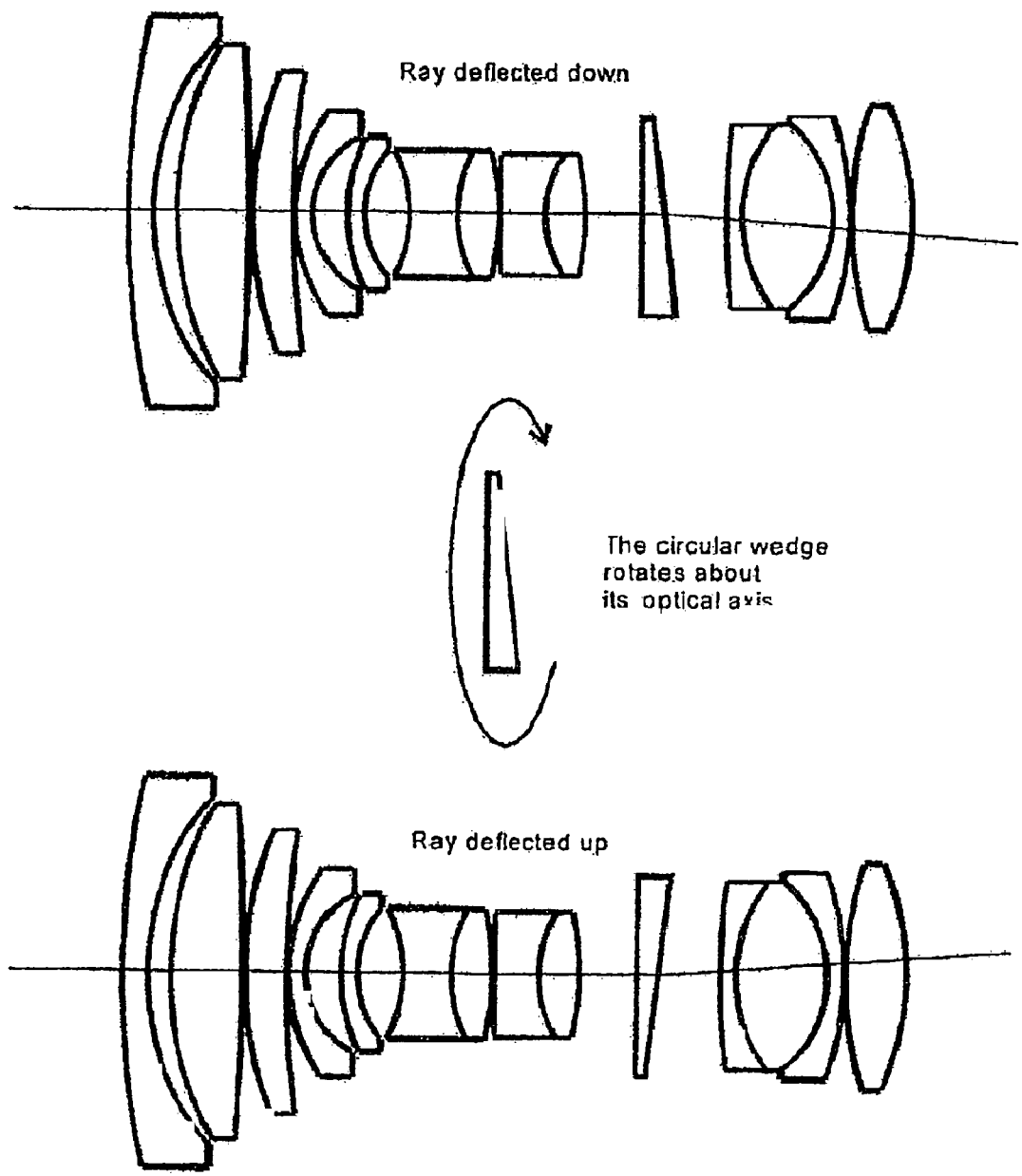
FIG. 7 is an illustration showing an example placement of a rotating wedge shaped lens according to an embodiment of the present invention.

The wedge shaped lens 600, may, for example, may be located in the projection lens as shown in FIG. 7. However, the wedge shaped lens can also be located elsewhere in the path of the output light rays.

Figure 8:
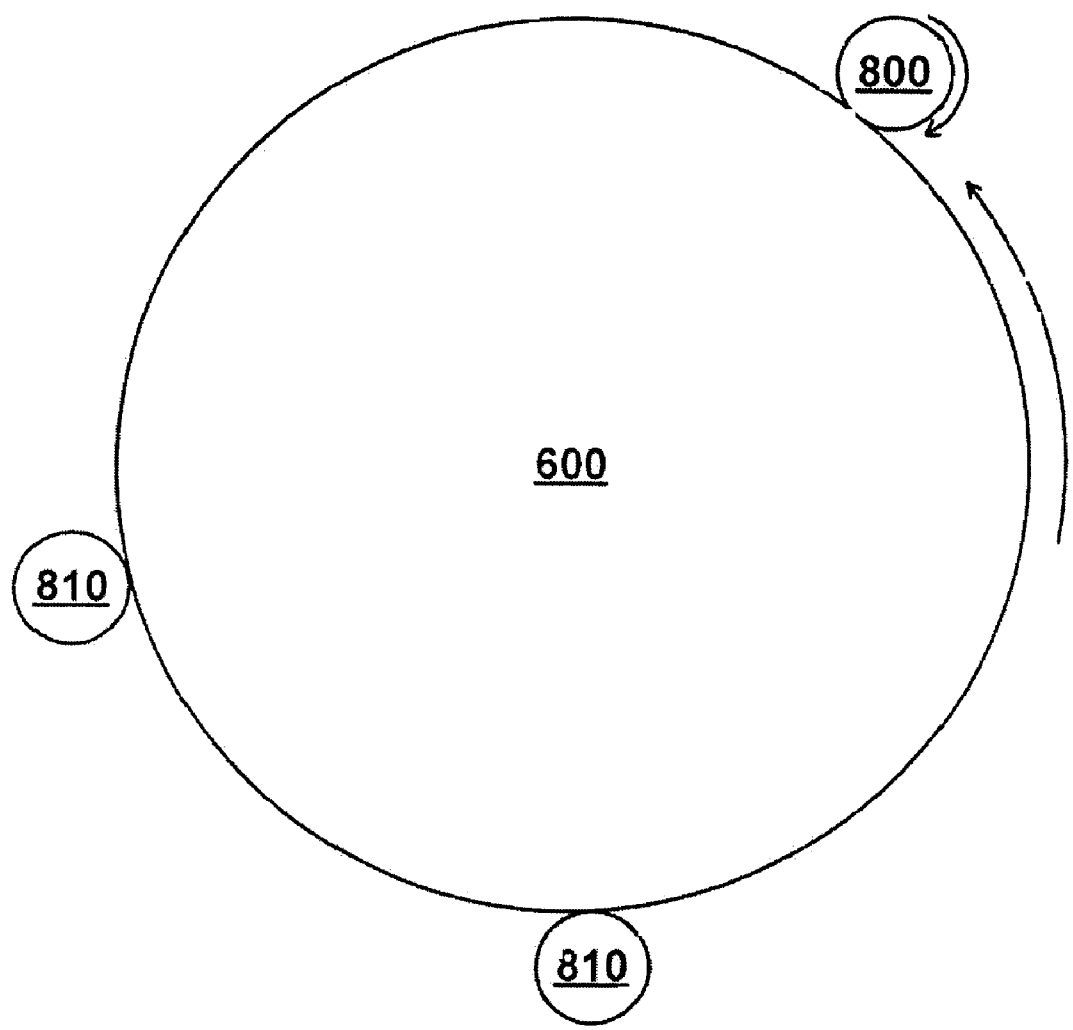
FIG. 8 is an example of an arrangment to implement a rotating lens according to an embodiment of the present invention.

In one embodiment, the wedge shaped lens is rotated about its optical axis to cause the intended movement of pixels in a projected image. As the wedge rotates, the direction of image displacement also rotates. FIG. 8 illustrates one embodiment to implement a rotating wedge shaped lens. A drive roller 800 and two support rollers 810 are positioned on a periphery of the wedge shaped lens. The drive roller is rotated by mechanical, electrical, or electromechanical propolsion which in turn rotates the lens on the supporting rollers.

Although the present invention has been described herein with reference to projection lenses, the devices and processes of the present invention may be applied to other lens types, including vision systems.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a vibrating element, any other equivalent device, such as piezo electrics, crystals, electromechanical, or other device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to pivot points, lenses, shock absorbers, microdisplays, light engines, etc should also be consider in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, filling microdisplay pixel arrays with new and/or interpolated data, energizing vibrating elements at fixed and/or variable frequencies, and the display, storage, or communication of results according to the processes of the present invention.

The present invention may suitably comprise, consist of, or consist essentially of, any of element (the various parts or features of the invention, e.g., lenses, shock absorbers, pivot points, light engine) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

The invention claimed is:

1. A projection lens comprising:
a first vibrating element;
a first dithering lens coupled to the first vibrating element;
a second vibrating element; and
a second dithering lens coupled to the second vibrating element.

2. The projection lens according to claim 1, wherein the first vibrating element is directly attached to the first dithering lens.

3. The projection lens according to claim 1, wherein the first vibrating element is a piezo electric material.

4. A projection television, comprising:
a set of microdisplays;
electronics for energizing the microdisplays with image content;
a light engine comprising a light source and a set of optics configured to direct individual rays of light to each microdisplay and output a full color image modulated by the microdisplays; and
a projection lens for projecting the output full color image to a display screen;
wherein said projection lens comprises a set of lens elements including at least one dithered lens element; and
the at least one dithered lens element is configured to precisely place a dithered pixel only directly adjacent to a corresponding undithered pixel.

5. The projection television according to claim 4, wherein the projection lens comprises two dithered lenses.

6. The projection television according to claim 5, wherein the dithered lenses are dithered along axes that are 90 degrees opposed.

7. The projection television according to claim 4, wherein the microdisplays are energized with data comprising interpolated data.

8. The projection television according to claim 7, wherein the non image data is based on overall color and brightness in an area of the image to be displayed.

9. The projection television according to claim 4, wherein the microdisplays are energized such that some pixels of the microdisplays are energized with data comprising new non-image data.

10. The projection lens according to claim 4, wherein the dithered pixel is placed directly adjacent, around, and partially over the undithered pixel.

11. A projection television, comprising:

a set of microdisplays;

electronics for energizing the microdisplays with image content;

a light engine comprising a light source and a set of optics configured to direct individual rays of light to each microdisplay and output a full color image modulated by the microdisplays; and a projection lens for projecting the output full color image to a display screen;

wherein said projection lens comprises a set of lens elements including at least one dithered lens elements; and wherein at least one of the dithered lenses vibrates at a varying frequency.

* * * * *